UNITED STATES PATENT OFFICE.

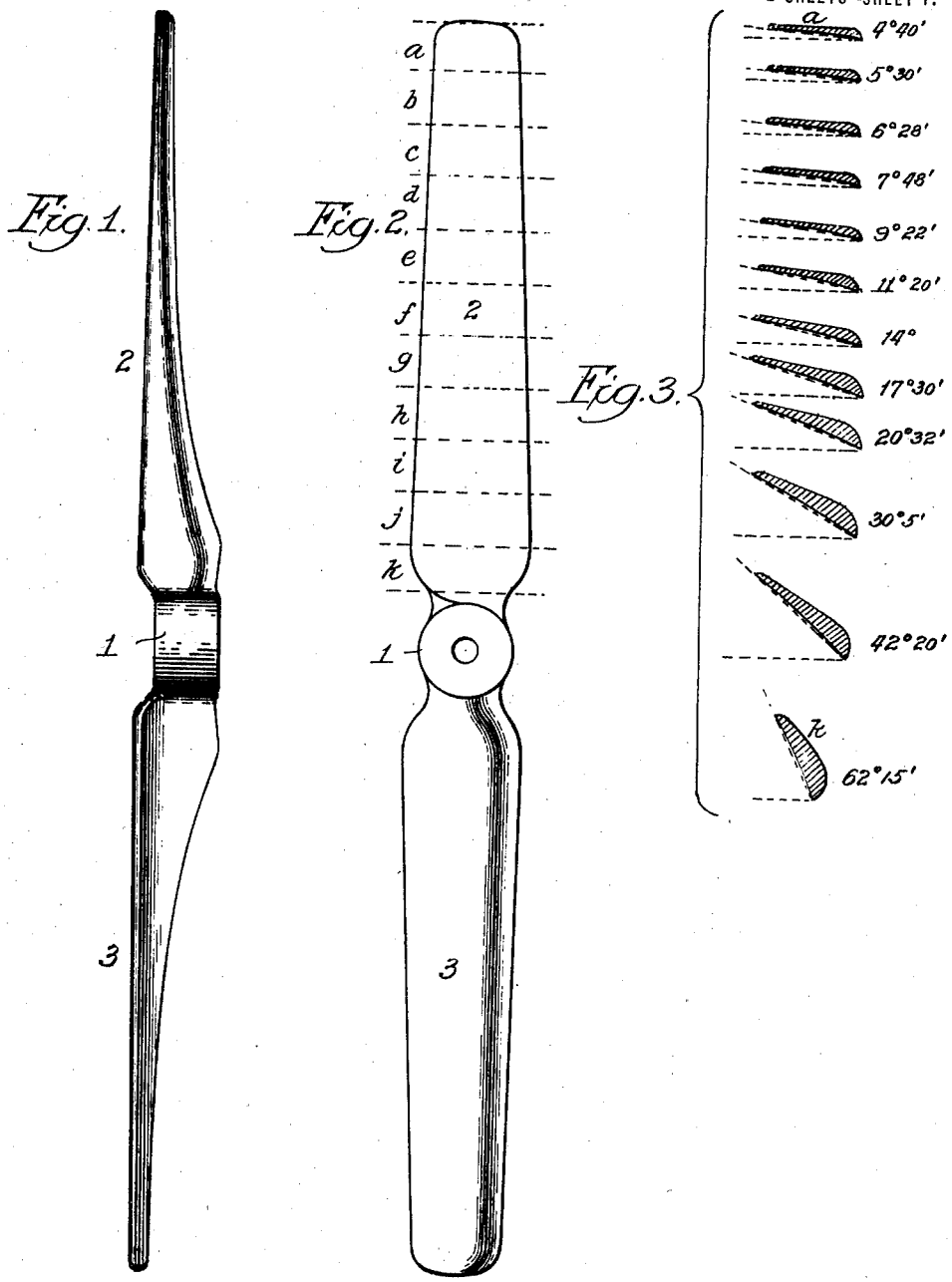

CURTIS H. LEINWEBER, WILLIAM H. LEINWEBER, VICTOR H. LEINWEBER, AND ANTON ZEMANN, OF CHICAGO, ILLINOIS, ASSIGNORS TO CONTINENTAL AIR CRAFT & TRANSPORTATION COMPANY, OF CHICAGO, ILLINOIS, A CORPORATION OF ARIZONA.

PROPELLER.

1,372,441.  Specification of Letters Patent.  Patented Mar. 22, 1921.

Application filed December 23, 1918. Serial No. 267,946.

*To all whom it may concern:*

Be it known that we, CURTIS H. LEINWEBER, WILLIAM H. LEINWEBER, VICTOR H. LEINWEBER, citizens of the United States, and ANTON ZEMANN, a citizen of Austria, all residing at Chicago, in the county of Cook and State of Illinois, have invented a new and useful Improvement in Propellers, of which the following is a specification.

Our invention relates to screw propellers for use in connection with airplanes, and other air crafts.

It is the object of our invention to provide a screw propeller of this type, so designed as to exert a greater thrust than any of the forms heretofore known, but which at the same time requires less power to operate than any of the old forms. It is a further object of our invention to provide a screw propeller of this type so designed as to exert a thrust evenly distributed from the tip to the hub of the propeller. Another object is to provide a propeller in which all the parts from the hub to the tip are substantially evenly active in producing the driving thrust.

The above and other features of invention, advantages and capabilities will become apparent from a detailed description of the accompanying drawings, in which we have illustrated a propeller embodying one form of our invention, but the construction there shown is to be understood as illustrative only, and not as defining the limits of our invention.

In the drawings:

Figure 1 shows a side elevational view of a propeller embodying one form of our invention.

Fig. 2 is a bottom plan view of the same, and

Fig. 3 is a diagrammatic view showing various cross-sections taken on the dotted lines of Fig. 2, to illustrate the gradual change in the pitch of the propeller from the tip to the hub.

Figure 4:
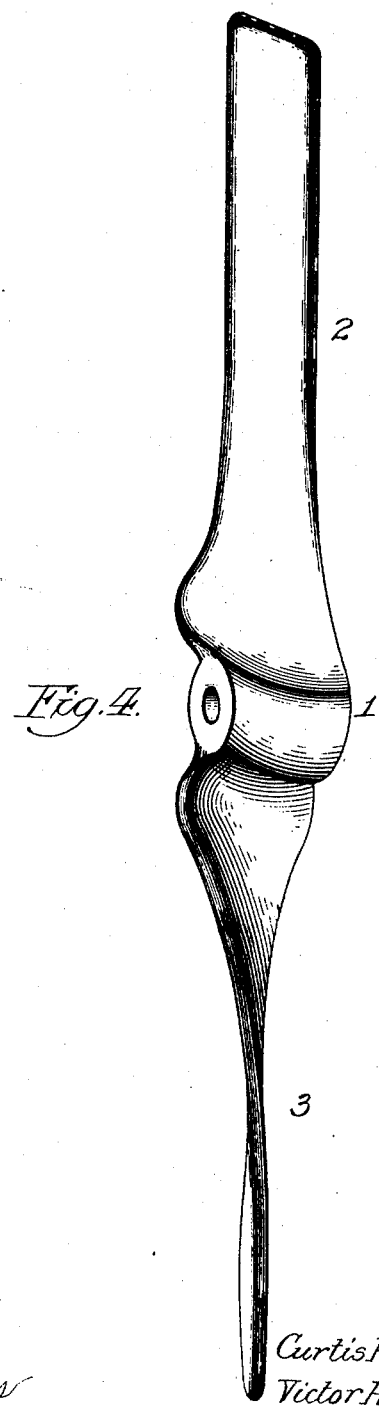
Fig. 4 is a perspective view of our improved propeller.

In the propellers now in use practically all the driving thrust is produced near the ends or tips of the propeller blades, which form has its inherent objections, among others, that by producing practically all the thrust near the tips or ends of the blades, there is a tendency to bend the blades at an intermediate point between the ends and hub, which is unsatisfactory and undesirable, and frequently causes breakage. Moreover in the old form considerably more than half of the blade is practically inactive, so far as producing a driving thrust is concerned, that is, from the hub to a point near the center of the blade. With our invention and as illustrated in the accompanying drawing, the entire blade from the hub to the tip is active and exerts a driving thrust driving the air away from and at right angles to the propeller in a solid ring coextensive with the propeller blades substantially uniform from the hub to the tip. It is, of course, obvious that the portions of the blade near the hub travel at a considerably less velocity than the outer portions of the blade. Therefore, in our invention we have provided a propeller having blades with a pitch to compensate or rather to increase the workings of the slow moving parts to correspond with the fast moving parts, in such a way as to actively distribute the thrust throughout the entire blade so as to drive the air directly away from the propeller in a solid ring coextensive with the propeller blades.

Referring to the drawing in detail:

The propeller consists of a hub 1, with integrally formed blades 2 and 3, the entire structure of which may be constructed of wood, metal or any other suitable material. For a better understanding we may say that the propeller illustrated in the drawings is provided with twelve foot blades, and in order to give a clear understanding of the varying pitch of the blade from the hub to the tip, we have divided the blade into twelve equal parts, as shown by the dotted lines in Figs. 2 and 3, which parts we have indicated by the reference characters $a$, $b$, $c$, $d$, $e$, $f$, $g$, $h$, $i$, $j$, and $k$. The pitch ranges from four degrees forty minutes in section $a$, gradually increasing until it reaches sixty-two degrees fifteen minutes in section $k$. The under side or driving surface of the propeller, which is provided with a gradual increase of pitch from the tip to the hub, is in semi-spiral form, and is slightly cupped or dished, as better illustrated in Fig. 3. This semi-spiral and cupped formation forms a pocket for the air, and tends to materially increase the driving force or thrust of the propeller. It will be noticed that the propeller is so designed that the blades are active and exert a thrust throughout from the tip to the hub. It will be noticed that section $k$, which in the illustration shown has the pitch of sixty-two degrees fifteen minutes, moves at a less velocity than the adjacent section, so that in order to give it substantially the same driving power or thrust it has a greater pitch than the adjacent section $j$, which has practically forty-two degrees twenty minutes, and so on to the tip the pitch gradually decreases until it reaches practically four degrees forty minutes in section $a$. Of course it will be clearly understood that this particular range of pitch is not necessary, that is, our invention is not limited to this particular range of pitch, but various ranges may be tilized. Our invention contemplates as one of the important features, a propeller blade having such a range of pitch from the tip to the hub as to make the blade throughout active, in exerting a driving power or thrust. Another feature of our propeller is that the blades are of semi-spiral contour which facilitates the screw action of the propeller when in operation. It is also to be noted that the shape of the blades of our propeller, and especially so adjacent the hub, closely follow that of a wing of a bird. This together with the other features pointed out heretofore result in a greater suction on one side of the blade, and greater compression of the air adjacent the hub, and the exertion on the lower or rearward side of the propeller of a direct and uniform pressure or thrust throughout the entire blade.

In order to increase the driving power or thrust of the blades near the hub, in addition to increasing the pitch through those sections, we also make that portion of the blades wider than the portion near the tip, as best shown at 5 in Fig. 2, which wider driving surface increases the thrust at those points, and tends to assist in equalizing the thrust throughout the blade. For the sake of clearness we have indicated in Fig. 3 the pitch of the different sections from the tip to the hub, in the particular embodiment shown.

Having thus described our invention, what we claim as new and desire to secure by Letters Patent, is:

1. An air propeller having a different pitch at each longitudinally spaced point of the blade, the effective working portion of the blade extending to the hub, the pitch being greatest at the hub, whereby to give a substantially equal thrust throughout the entire blade from tip to hub.

2. An air propeller having a different pitch at each longitudinally spaced point of the blade, said pitch gradually increasing from the tip toward the hub, and being greatest at the hub, the blade being cup-shaped at the hub and of greatest width close up to the hub, so as to substantially equally distribute the thrust throughout the entire propeller from tip to hub.

3. An air propeller provided with a wing shaped blade having a pitch increasingly greater at each longitudinally spaced point from the tip to the hub so as to give a substantially equal thrust throughout the entire blade, said blade also increasing in effective width from the tip up to the hub.

4. In an air propeller a blade of greater width at the hub than at the tip, said blade being cupshaped at the hub, at which point the pitch is greatest to give a substantially equal thrust from tip to hub.

5. An air propeller blade of wing shape adjacent the hub and having a continuously increasing pitch from tip to hub, the width and pitch being greatest at the hub, to give a greater suction on one side of the propeller and to drive the air backward on the other, with equal thrust from tip to hub.

6. A propeller for air-crafts provided with a driving surface having a different pitch at each longitudinally spaced point, said surface being of greatest width and pitch at the hub, to exert a direct and uniform pressure or thrust throughout the entire blade from tip to hub.

7. A propeller for air-crafts having a blade of substantial width at the tip, the angle of transverse inclination of the blade gradually increasing from tip to hub, the rate of increase being greater as the hub is approached, the greatest pitch being at the hub, the effective width of the blade also increasing as the hub is approached and being greatest at the hub, to produce a substantially equal thrust throughout the entire blade from tip to hub.

8. A propeller for air-crafts having a blade of substantial width at the tip, the angle of transverse inclination of the blade gradually increasing from tip to hub, the rate of increase being greater as the hub is approached, the greatest pitch being at the hub, the effective width of the blade also increasing as the hub is approached and being greatest at the hub, said blade having a cupped working face at and adjacent the hub, to produce a substantially equal thrust throughout the entire blade from tip to hub.

In witness whereof, we hereunto subscribe our names to this specification in the presence of two witnesses.

CURTIS H. LEINWEBER.
WILLIAM H. LEINWEBER.
VICTOR H. LEINWEBER.
ANTON ZEMANN.

Witnesses:
EDITH OLSON,
CLARENCE J. LOFTUS.